Nov. 10, 1964    G. GASSNER    3,156,164
MACHINE FOR FORMING A FLUID-TIGHT BAG
OF THERMO-WELDABLE MATERIAL
Filed Oct. 4, 1960    3 Sheets-Sheet 1

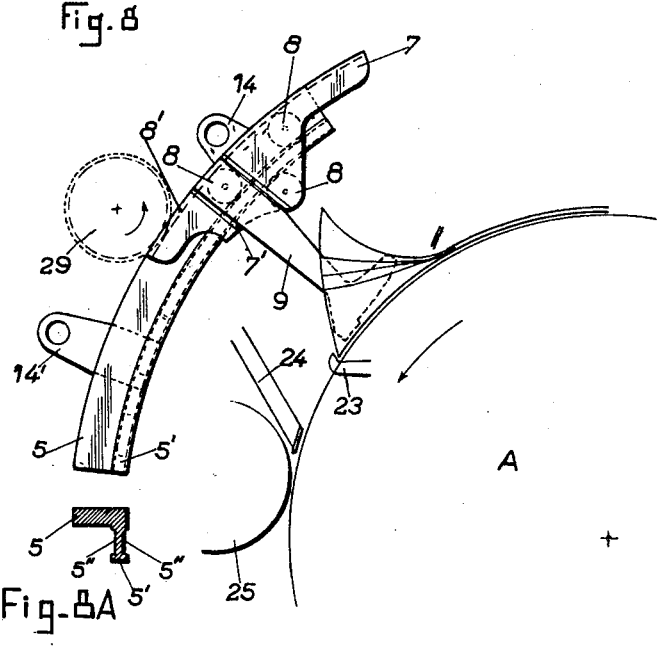
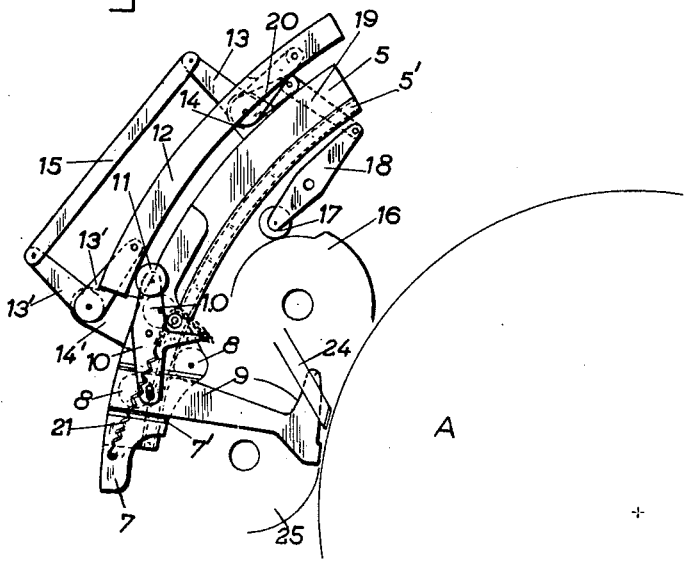

Nov. 10, 1964    G. GASSNER    3,156,164
MACHINE FOR FORMING A FLUID-TIGHT BAG
OF THERMO-WELDABLE MATERIAL
Filed Oct. 4, 1960    3 Sheets-Sheet 3

Inventor
Georges Gassner
By Ernest F. Marmorek
Attorney

United States Patent Office 3,156,164
Patented Nov. 10, 1964

3,156,164
MACHINE FOR FORMING A FLUID-TIGHT BAG OF THERMO-WELDABLE MATERIAL
Georges Gassner, Schiltigheim, France, assignor to Les Ateliers de Constructions Mecaniques C. & A. Holweg, S.A.R.L., Strasbourg, France, a corporation of France
Filed Oct. 4, 1960, Ser. No. 60,462
Claims priority, application France Dec. 21, 1959
1 Claim. (Cl. 93—22)

The present invention relates to a bag provided with a fluid-tight square bottom of thermo-weldable material and a machine for producing the same.

It is one object of the present invention to provide a bag with a fluid-tight square bottom made of thermo-weldable material, such, for instance, as paper associated with polyethylene or paper coated throughout with a thermo-weldable varnish or papers which have been coated with such a varnish at only those points where the welding is to be performed, and the like.

It is another object of the present invention to provide a bag with a fluid-tight square bottom made of thermo-weldable material, wherein the seam in its bottom consists of a weld interconnecting the two plies in the front edge of the section of a tubular blank, which is to be transformed into a bag. The front edge, as appears after the so-called "opening of the bottom," is directed longitudinally to the axis of the bag which is being formed and is caused to stand over the open bottom of the bag. After welding, the edge is folded and glued over the bottom which is still open, this operation being followed by the finishing of the bottom, which finishing consists in folding back and gluing in succession the two triangular lugs formed by the open bottom over the section of the latter which separates the lugs from each other and forms the actual bottom of the bag.

It is yet another object of the present invention to provide a bag provided with a fluid-tight square bottom of thermo-weldable material, which includes means which serve for forming a bag provided with a square bottom, the elements of which are glued at raised temperature, these means including in addition to the conventional means producing the tubular blank provided with lateral pleats or otherwise, and for cutting the blank into sections to be transformed into bags, a first drum or the like part adapted to open the bottom of the bag and associated with a movable cam, stationary guiding members and stationary presser rollers, all the parts including the drum cooperating such as to produce the opening of the bottom, the formation of the sealing edge and the raising of the latter perpendicularly to the bottom of the bag, with a view to furthering the sealing by means of two jaws which are heated and closed over it, a sealing drum or the like part of a square cross-section to which the bag, prepared by the first-mentioned drum or the like member, is brought and on which the projecting edge is sealed over the bottom and, lastly, a drum over which the sealed edge of the bottom and then the two triangular lugs of the latter are folded, in succession, to be glued on the bottom, the finished bag being finally allowed to drop onto a stationary or movable table with or without bag-counting means.

With these and other objects in view, which will become apparent in the following detailed description, the present invention will be clearly understood in connection with the accompanying drawings, wherein:

FIGS. 8 and 9 show diagrammatically in two different positions the arrangement ensuring the opening of the bottom, together with the raising of the front edge of the tubular blank section along which the weld forming the seam in the bottom of the bag is to be executed;

FIG. 8a is a section along the lines 8a—8a of FIG. 8; and

Figure 1:
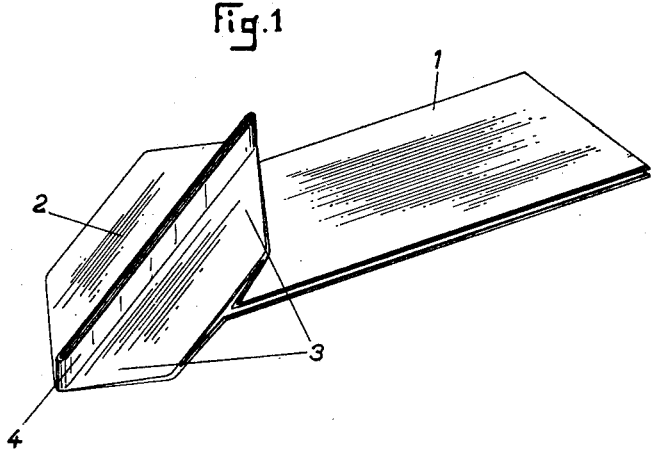
FIGURE 1 is a perspective view of a bag with a square bottom, in the position after it has been subjected to the machine according to the present invention to the opening of its bottom.

Referring now to the drawings, and in particular to FIG. 1, a partly finished bag is illustrated which comprises a pleated tubular blank 1, and a bottom 2 shown after its opening. Two triangular lugs 3 are provided to be folded subsequently over the actual bottom 2, are provided and the front edge 4 of the tubular blank 1 extends in a standing position in alignment between the apices of the two triangular lugs 3.

Figure 10:
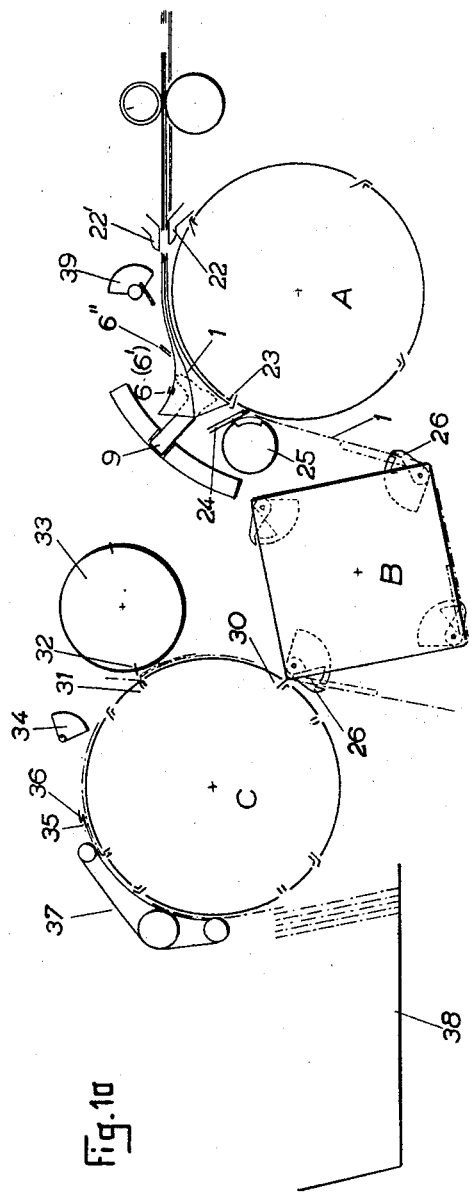
FIGS. 10 and 11 show also in a diagrammatic manner, respectively, an elevational view and a plan view of the entire machine, except the input section which provides for the formation of the blank.
Figure 11:
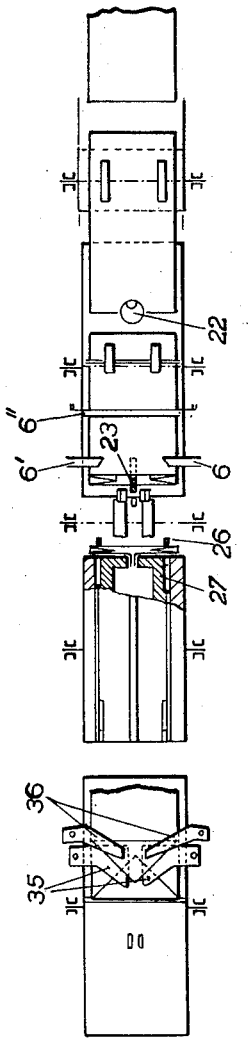

It is a well-known fact that in bags with a square bottom, as generally produced, the edges of the two plies of the tubular blank engage each other along the longitudinal axis of symmetry of the bag or, more accurately, of the bottom of the bag which is being formed, while no projecting edge 4 is provided. Now, this lug forms the essential novel step of the improved bag according to the present invention, since it allows the formation, under excellent conditions, of a seam in the bottom of the bag through a perfectly fluid-tight welding. To form this projecting edge 4 on the improved machine according to the present invention, the arrangement illustrated in FIGS. 8 and 9 is resorted to. In the illustrated example, the tubular blank 1 is transformed into a bag with a square bottom on three successive drums, as clearly shown in FIGS. 10 and 11. These drums are, respectively, the drum A for the opening of the bottom of the bag, the drum B for sealing the bottom and the drum C for the folding of the bottom and the first of the three drums is associated with the novel arrangement which will now be described.

Figure 5:
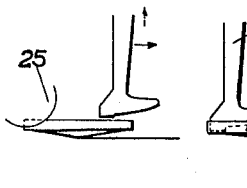
FIGS. 2 to 7 illustrate in plan view the different stages of formation of the bag according to FIG. 1, except the conventional steps providing for the formation of a tubular blank, the finishing of the bottom and the removal of the finished bag.
Figure 4:
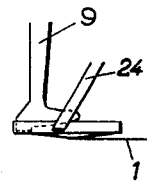
Figures 2, 3:
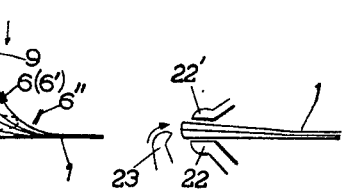

This arrangement includes an arcuate guiding member 5 arranged coaxially with the drum A, adapted to open the bottom 2 of the bag. The guiding member 5 is provided with a flange 5' operating as a guide for the movement of a carriage 7 provided with three rollers 8 which engage the corresponding raceways 5" (FIG. 8a), disposed on the opposite sides of the flange 5'. The carriage 7 is adapted to perform a reciprocating movement under the action of a train of gear wheels 29, meshing with teeth 8' of a gear-rack formed on the carriage 7, so that the forward movement of the carriage 7 may be obtained in accurate relationship with the rotary movement of the drum A. A finger 9 is guided inside slideways 7' of the carriage 7 such, that it may perform a downward and upward movement directed radially relative to the drum A. The finger 7, as it moves downwards, engages the drum A at the beginning of the forward travel of the carriage 7 and is thenafter shifted sufficiently away from the latter when it rises at the end of the stroke, so that it may return into its starting position, in which it is sufficiently raised in order not to impinge against the rear fold closing the projecting tubular edge 4 of the blank. The downward and upward movements of the finger 9 are controlled by a small double-armed lever 10 (FIG. 9) pivotally mounted on the carriage 7 and one arm of the lever 10 is pivotally secured to the finger 9, while the other arm carries a roller 11 engaging an arcuate shoe 12 pivotally carried by the inner arms of bell cranks 13 and 13', the pivotal axes of which are carried by lugs 14 and 14', which are integral with the arcuate guiding member 5. The outer arms of these bell cranks 13 and 13' are pivotally secured to and interconnected by a link 15, in order to permit a parallel motion of the bell cranks 13 and 13' which ensures a shifting of the arcuate shoe 12 along a line parallel with its chord. Thus the arcuate shoe 12 performs a reciprocating movement towards and from the drum A. It is produced by a cam 16 engaged by a cam follower 17. The latter is carried by a two-armed lever 18 rocking round a stationary spindle 18', of a link 19 pivotally secured to the free arm of the lever 18 disposed opposite the arm carrying the roller 17 and of a lever 20 controlled by the link 19 and keyed to the pivot of one of the bell cranks 13. This movement results in a raising and lowering of the arcuate shoe 12, so as to return the finger 9 towards the drum A and to move it away from the latter, respectively. The movement of the finger 9 towards the drum A is urged by a spring 21 acting tractionally, while the rising of the finger 9 from the drum A is obtained under the action of the pressure of the arcuate shoe 12 against the force of the spring 21. The operation of such an arrangement appears clearly from inspection of FIGS. 2 to 5, wherein the different bag-forming steps obtained through the drum A are shown on a plane. FIG. 2 illustrates the conventional starting of the opening of the bottom 2 by means of two suction cups 22 and 22'; as soon as the opening has been achieved to a sufficient extent, a peripheral clamping member 23 carried by the drum A closes over the lower ply of the tubular blank 1 and ensures the continuation of the drive of said blank towards the location of the finger 9. At about the same moment, two pairs of tongues 6 and 6' are subjected to a transverse shifting movement, associated with an upwardly directed rocking movement, so as to engage the upper ply of the blank 1 and to raise it. Thus, the opening in the bottom 2 is gradually enlarged, until its height is sufficient for the tubular blank 1 to engage readily the finger 9. At the very moment at which the tongues 6 and 6' become operative, a blade 6" engages the tubular blank 1 at a short distance from its front end, so as to form the ridge about which the upper ply of the tubular blank 1 is to be folded. As soon as the tubular blank 1 reaches a point in alignment with the finger 9, while the carriage 7 lies in the position illustrated in FIG. 8, the finger 9 moves radially towards the drum A and urges the lower ply of the tubular blank 1 against the drum A, whereas the driving clamp 23 recedes as illustrated in FIG. 3. It will be observed, that the point of impact between the finger 9 and the lower ply of the tubular blank 1 lies at a distance from the front edge of the latter which corresponds substantially to the predetermined height of the edge 4. As the tubular blank 1 thus held by the finger 9 moves forwardly, stationary guides 24 produce a lifting of the sealing edge 4 and form a preliminary marking along the finger 9 of the two folds to be obtained along said lower section of said edge (FIG. 4). The folds are then strengthened by stationary presser rollers 25 which simultaneously flatten the bottom and provide for the drive of the tubular section of the blank by operating in lieu of the finger 9 which then begins a sliding movement over the inner surfaces of the raised edge 4. At the end of its stroke, the finger 9 rises again and immediately afterwards the carriage 7 recedes, as shown in FIG. 5. It will be observed that the finger 9 releases thus completely the inside of the edge 4, so as to produce a sort of closed and very flat loop while leaving the edge untouched throughout its extent and, in particular, along its two terminal folds which are directed upwardly.

Figure 7:
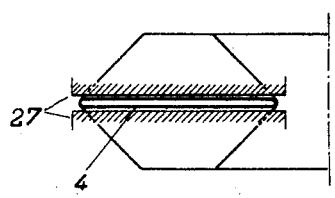
Figure 6:
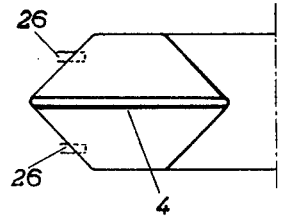

The bag thus prepared is transferred onto the sealing drum B which has a square cross-section and is provided along each of its ridges with two pincers 26 which engage the bag as soon as it comes into proximity with the latter, as shown in FIG. 6, said engagement coinciding in time with the release of the bag by the presser rollers 25. The pincers 26 are adapted to execute a circular movement between two comparatively narrow limits by conventional means, as illustrated, in particular, in FIG. 10, where the lower clamping pincers on the right hand side project out of the drum B, so as to take hold of the bag 1 fed by the drum A, while the lower clamping pincers on the left-hand side are retracted within the drum B and have brought the previous bag in the series into a position for which its projecting edge 4 is held between two opening and closing jaws 27 which are heated by any suitable means to the required temperature (FIG. 7).

After a sealing of its edge 4, the bag in the making is transferred onto the drum C which serves for folding its bottom. The bag engages the drum C with its bottom in its open condition and the sealed edge of said bottom in its raised poistion. The drive of the bag is first ensured by collapsible peripheral pincers 30 on the drum C. As soon as it reaches the point at which radial pincers 31 on the drum C are located in registry with a collapsible rule 32 carried by a gluing roller 33, the bag is urged into engagement with the pincers 31 and the fold forming the first lug on the bottom of the bag is thus produced. This lug is then applied completely over the bottom of the bag by a rotary sector 34, which is tangentially mounted with reference to the drum C.

The second lug on the bottom of the bag is folded over a rectilinear edge formed at the desired moment by two collapsible arms 35 and the folding back is furthered by two other arms 36 arranged above the first-mentioned arms 35 and rotating about the same axes as the latter, but in an opposite direction. After the lugs have been thus folded back, they remain glued together with the sealed edge 4 of the bottom, over the bottom which has been coated with adhesive to the amount required during its passage under the gluing roller 33.

The finished bag enters finally a passage or gap between the drum C and fed to an endless conveyor strip 37, which positions the bag on a stationary or movable table 38.

The operations performed with the drum C and the means for performing such operations are well-known per se and do not form part of the present invention.

The machine which has just been described ensures the continuous production of bags provided with a square bottom glued at raised temperature and it thus provides a practical and complete solution for the problem constituted by the continuous mechanical production of bags of the type referred to.

Obviously, the present invention is not limited to the embodiments described and illustrated and it includes all the modifications thereof falling within the scope of the accompanying claims. Certain members or sections of the machine may be obviously replaced by equivalent members or sections. The two drums A and B for opening the bottom and for sealing the bag are not essential, since the operations referred to may as well be executed on a machine provided with tables and it is sufficient, in such a case, to bring various detail modifications to the means provided for the execution of said operations.

Furthermore, the machine according to the present invention may serve in the same manner for the production of bags with a complete square bottom and of bags, the bottom of which has its corners cut off.

I claim:

In a machine for forming from a flat blank a fluid-tight bag of thermo-weldable material having a substantially square bottom including flaps and a sealed edge over said flaps, a rotary drum adapted to be engaged by a flat tubular bank, a stationary arcuate guiding member disposed concentrically and spaced apart from the periphery of said drum, a carriage reciprocating along said arcuate guiding member about said drum, a finger supported by and moveable through said carriage along said arcuate guiding member and reciprocating in said carriage radially relative to said carriage and said rotary drum, cam operated means for reciprocating said finger during the reciprocating movement of said carriage and coordinated to the rotation of said rotary drum, stationary guiding members disposed adjacent the periphery of said rotary drum for raising the bottom edge of said flat blank, stationary presser rollers following said stationary guiding members and engaging the periphery of said rotary drum to flatten said bottom edge of said flat blank, said finger being adapted to engage the inner surface of said bottom edge of said flat blank during its movement toward said rotary drum, and means for sealing said bottom edge over the bottom portion of said flat blank in order to form a fluid-tight bag.

References Cited in the file of this patent

UNITED STATES PATENTS

| | | |
|---|---|---|
| 807,211 | Smith | Dec. 12, 1905 |
| 1,020,773 | Muller | Mar. 19, 1912 |
| 2,312,281 | Claspill et al. | Feb. 23, 1943 |
| 2,353,402 | Haslacher | July 11, 1944 |
| 2,374,793 | Waters | May 1, 1945 |
| 2,496,796 | Kardon | Feb. 7, 1950 |
| 2,599,567 | McCrery et al. | June 10, 1952 |
| 2,673,495 | Hecker et al. | Mar. 30, 1954 |
| 2,773,435 | Richens | Dec. 11, 1956 |
| 2,903,947 | Weisshuhn | Sept. 15, 1959 |